(12) United States Patent
Mellor

(10) Patent No.: US 10,086,930 B2
(45) Date of Patent: Oct. 2, 2018

(54) THREE-POSITION AIRCRAFT TAIL SKID MECHANISM AND METHOD OF ACTUATION

(71) Applicant: The Boeing Company, Chicago, IL (US)

(72) Inventor: Mitchell L. R. Mellor, Bothell, WA (US)

(73) Assignee: The Boeing Company, Chicago, IL (US)

( * ) Notice: Subject to any disclaimer, the term of this patent is extended or adjusted under 35 U.S.C. 154(b) by 201 days.

(21) Appl. No.: 14/834,369

(22) Filed: Aug. 24, 2015

(65) Prior Publication Data

US 2017/0057625 A1    Mar. 2, 2017

(51) Int. Cl.
*B64C 25/52* (2006.01)
*B64C 25/26* (2006.01)
*B64C 25/00* (2006.01)

(52) U.S. Cl.
CPC .............. *B64C 25/52* (2013.01); *B64C 25/26* (2013.01); *B64C 2025/005* (2013.01)

(58) Field of Classification Search
CPC .......... B64C 25/26; B64C 25/32; B64C 25/52
See application file for complete search history.

(56) References Cited

U.S. PATENT DOCUMENTS

| 1,884,596 | A | * | 10/1932 | La Cierva | B64C 25/06 244/109 |
| 2,355,210 | A | * | 8/1944 | Eddy | B64C 25/14 244/109 |
| 3,493,082 | A | * | 2/1970 | Bell | B64C 25/001 188/377 |
| 4,815,678 | A | * | 3/1989 | Gawne | B64C 25/00 244/100 R |
| 5,927,646 | A | * | 7/1999 | Sandy | B64C 25/52 188/377 |
| 6,845,944 | B2 | * | 1/2005 | Bays-Muchmore | B64C 25/00 244/109 |
| 2013/0233970 | A1 | * | 9/2013 | Cottet | B64C 25/52 244/109 |

FOREIGN PATENT DOCUMENTS

EP    0 319 051 A2    6/1989
EP    2 636 595 A1    9/2013

* cited by examiner

*Primary Examiner* — Michael H Wang
(74) *Attorney, Agent, or Firm* — Haynes and Boone, LLP

(57) ABSTRACT

A system includes an aircraft having a fuselage with a tail portion. A tail skid is disposed in an opening of the tail portion. The tail skid includes a ground contact shoe and a mechanism configured to selectably move the ground contact shoe between respective ones of a stow position disposed within the opening, a landing position disposed below the opening, and a takeoff position different than the stow and landing positions. Before a takeoff or a landing, the ground contact shoe is moved to a corresponding one of the takeoff or landing positions. In the event of an over-rotation or an over-flaring of the aircraft during a takeoff or a landing, respectively, the ground contact shoe makes contact with the ground and a shock absorber of the system absorbs a shock of the contact and thereby prevents tail strike damage to the aircraft.

24 Claims, 15 Drawing Sheets

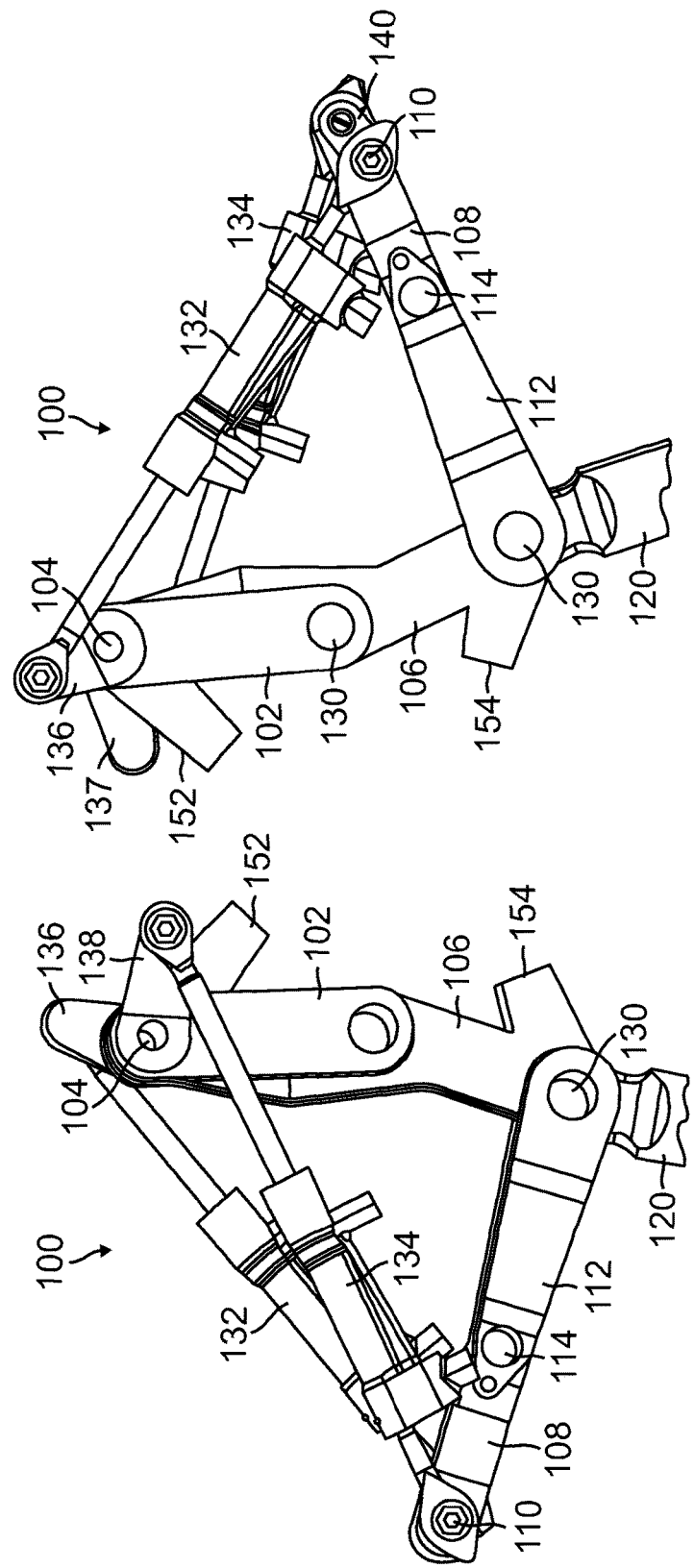

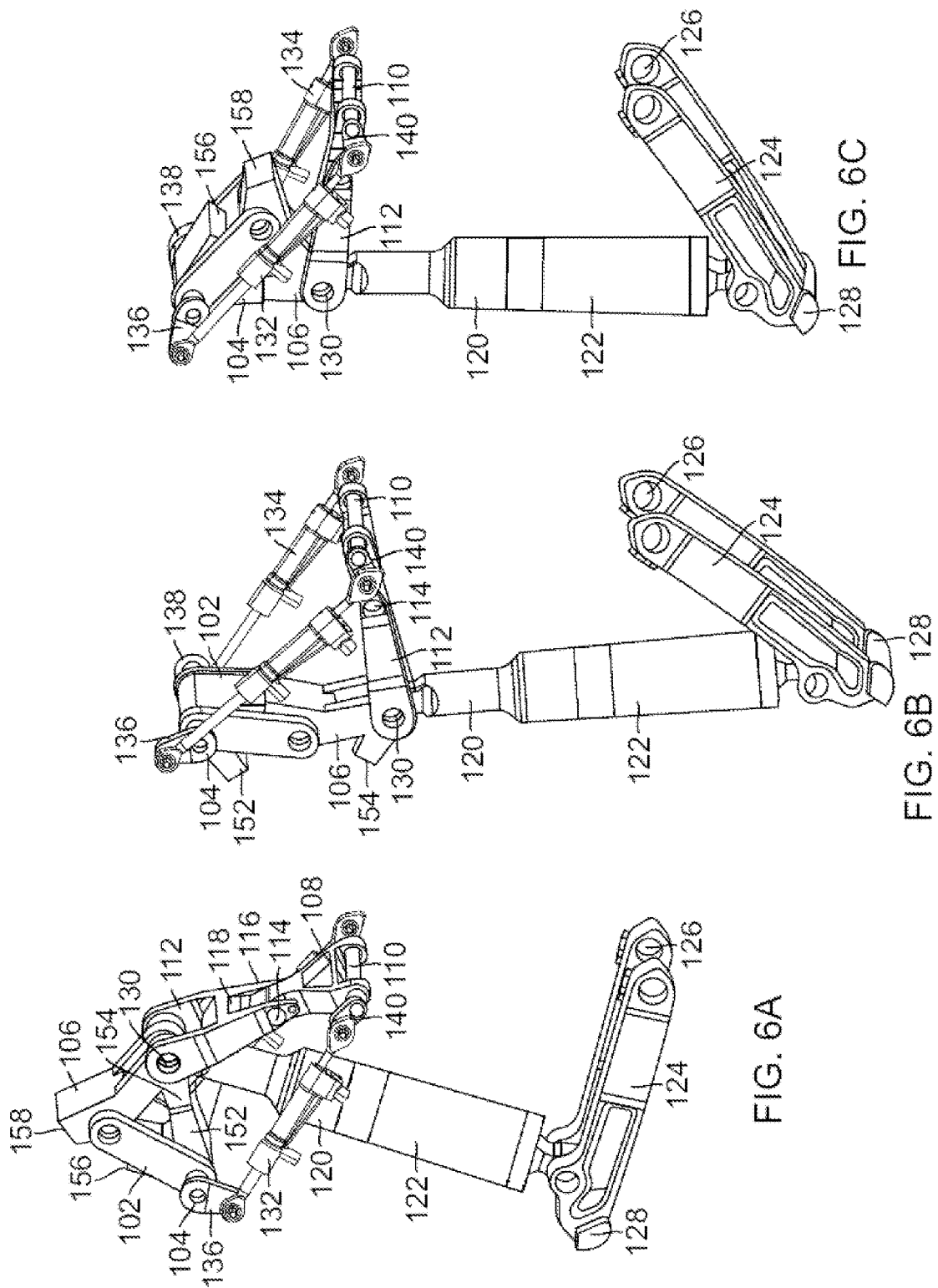

| | Takeoff/ Landing actuator (TOL) | Stow actuator (S) |
|---|---|---|
| Landing Position | Extended | Extended |
| Takeoff Position | Retracted | Extended |
| Stow Position | Retracted | Retracted |

THREE-POSITION AIRCRAFT TAIL SKID MECHANISM AND METHOD OF ACTUATION

BACKGROUND

1. Technical Field

This disclosure relates to aircraft tail skids in general, and in particular, to a three-position aircraft tail skid mechanism and methods for actuating it.

2. Related Art

A "tail strike" occurs when the tail of a tricycle-gear aircraft strikes the ground during takeoff or landing. Although many tail strikes occur during the "rotation" phase of a takeoff, i.e., a maneuver in which the pilot raises the nose of the aircraft and lowers its tail to achieve a liftoff of the aircraft from the runway, some tail strikes occur during the "flare" phase of a landing, i.e., a maneuver in which the pilot raises the nose of the aircraft and lowers its tail to slow the aircraft and/or decrease its rate of descent toward the runway. Tail strikes are often due to pilot error, as well as to the presence of gusty winds or wind shear.

Tail skids are often provided on tricycle-gear aircraft to prevent or reduce damage to the aircraft in the event of a tail strike. These can range from structures that are fixed to a lower surface of the tail portion of an aircraft's fuselage, to structures that employ a mechanism to move between a deployed position for takeoff or landing operations and a more streamlined, retracted configuration for cruise operation.

Tail skid mechanisms that utilize the same position for takeoff and landing can result in a penalty in that, during a takeoff, they limit downward rotation of the tail to that which is safely allowable for a landing, which may be less than that safely allowable for a takeoff. This results in the use of unnecessarily higher rotation ($V_R$) and liftoff ($V_{LO}$) speeds during a takeoff, and hence, unnecessarily longer takeoff runs and the need for longer runways.

Accordingly, there is a need for aircraft tail skids that, while effectively preventing or reducing tail strike damage to a host aircraft, can be selectably deployed to and locked in one of three different positions relative to the aircraft, viz., a stowed position, a takeoff position, and a landing position, and that also minimize the number, size and types of the components needed to implement and actuate the mechanism.

SUMMARY

In accordance with the present disclosure, example embodiments of aircraft tail skid mechanisms are provided, together with methods for actuating them, that effectively prevent or reduce tail strike damage to a host aircraft, that can be selectably deployed to and locked in one of three different positions relative to the aircraft, viz., a stow position, a landing position, and a takeoff position intermediate the stow and landing positions, and that minimize the number, size and types of components need to implement and deploy the mechanisms.

In one example embodiment, a system comprises an aircraft having a fuselage with a tail portion and a tail skid disposed in an opening of the tail portion. The tail skid comprises a ground contact shoe and a mechanism configured to selectably move the ground contact shoe between respective ones of a stow position disposed within the opening, a landing position disposed below the opening, and a takeoff position disposed below the opening and above the landing position.

In another example embodiment, a method for protecting an aircraft against tail strike damage comprises providing a tail skid disposed in an opening of a tail portion of the aircraft. The tail skid comprises an elongated shock absorber having a ground contact shoe disposed at a lower end thereof. The ground contact shoe is moveable between respective ones of a stow position disposed within the opening, a landing position disposed below the opening, and a takeoff position disposed below the opening and above the landing position. Before a takeoff or a landing, the ground contact shoe is moved to a corresponding one of the takeoff or landing positions such that, in the event of an over-rotation of the aircraft during a takeoff, or an over-flaring of the aircraft during a landing, the ground contact shoe makes contact with the ground and the shock absorber absorbs the shock of, or a portion of the kinetic energy associated with, the contact and thereby prevents tail strike damage to the aircraft.

In another example embodiment, a tail skid mechanism comprises upper and lower vertical links, each having opposite upper and lower ends, and front and rear horizontal links, each having opposite front and rear ends. The upper end of the upper vertical link is coupled to a first attach pin for conjoint rotation therewith. The upper end of the lower vertical link is coupled to the lower end of the upper vertical link for rotation relative thereto. An over-center locking mechanism extends between the upper and lower vertical links and is configured to prevent lateral movement of the hinge past a locked position in which the upper and lower vertical links are disposed generally collinear with each other, and to permit unlocking movement of the hinge relative to the locked position. The front end of the front horizontal link is coupled to a second attach pin for conjoint rotation therewith. The front end of the rear horizontal link is coupled to the rear end of the front horizontal link for rotational movement relative thereto, and such that a hinge is defined between the front and rear horizontal links. The rear end of the rear horizontal link is coupled to the lower end of the lower vertical link for rotation relative thereto. An over-center locking mechanism extends between the front and rear horizontal links and is configured to prevent downward movement of the hinge past a locked position in which the front and rear horizontal links are disposed generally collinear with each other, and to permit unlocking upward movement of the hinge relative to the locked position. The upper end of the shock absorber is coupled to the lower end of the lower vertical link and the rear end of the rear horizontal link for rotation relative thereto. A lever arm has a front end coupled to a third attach pin for rotation relative thereto and an opposite rear end coupled to the lower end of the shock absorber for rotation relative thereto. A ground contact shoe is disposed on the rear end of the lever arm. First and second crank arms are respectively fixed to opposite first and second ends of the first attach pin for conjoint rotation therewith, and a third crank arm is fixed to a first end of the second attach pin for conjoint rotation therewith. A stow actuator has a first end coupled to an outer end of the first crank arm for rotation relative thereto and a opposite second end coupled to an outer end of the third crank arm for rotation relative thereto. A takeoff/landing actuator has a first end coupled to an outer end of the second crank arm for rotation relative thereto, and an opposite second end coupled to an end of the second attach pin opposite to the first end thereof for rotation relative thereto.

The scope of the invention is defined by the claims, which are incorporated into this section by reference. A better understanding of the tail skid mechanisms and methods of actuating them of the present disclosure, as well as an appreciation of the above and additional advantages thereof, will be afforded to those of skill in the art by a consideration of the following detailed description of one or more example embodiments thereof. In this description, reference is made to the various views of the appended sheets of drawings, which are briefly described below, and within which like reference numerals are used to identify like ones of the elements illustrated therein.

BRIEF DESCRIPTION OF THE SEVERAL VIEWS OF THE DRAWINGS

FIGS. 3A and 3B are partial left-side and right-side elevation views, respectively, of an upper portion of the tail skid mechanism, showing a configuration and arrangement of a pair of actuators and a trio of actuator crank arms thereof;

FIGS. 6A, 6B and 6C are front-and-right-side perspective views of the example tail skid mechanism, in which adjacent aircraft structure has been omitted for clarity, and shown disposed in the stow, landing and takeoff positions, respectively;

DETAILED DESCRIPTION

The present disclosure presents embodiments of aircraft tail skid mechanisms and methods for actuating them that effectively prevent or reduce tail strike damage to a host aircraft, that can be selectably deployed to and locked in one of three different positions relative to the aircraft, and that minimize the number, size and types of components need to implement and deploy the mechanisms.

Figure 1A:
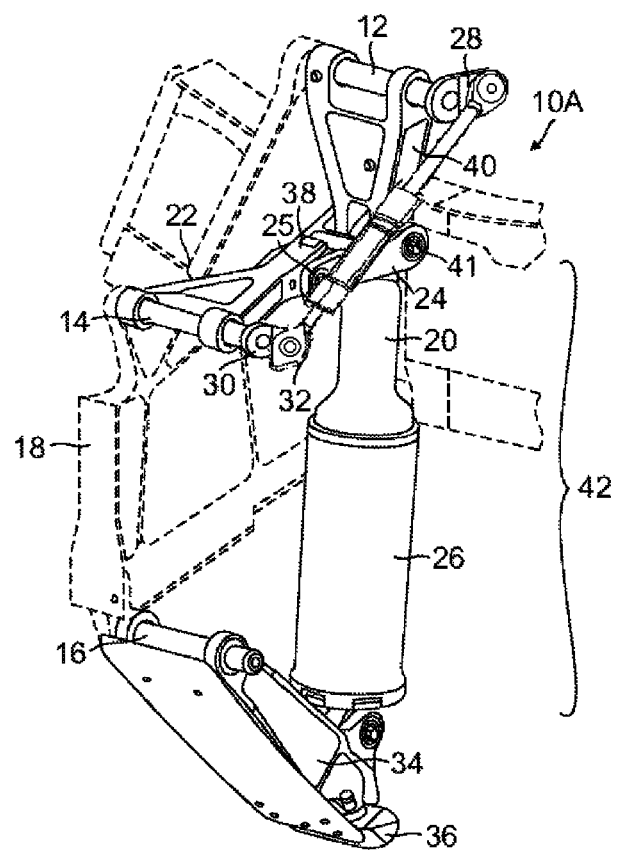
FIGS. 1A and 1B are front-and-left-side perspective views of two prior art, two-position tail skid mechanisms, both shown disposed in a landing position.
Figure 1B:
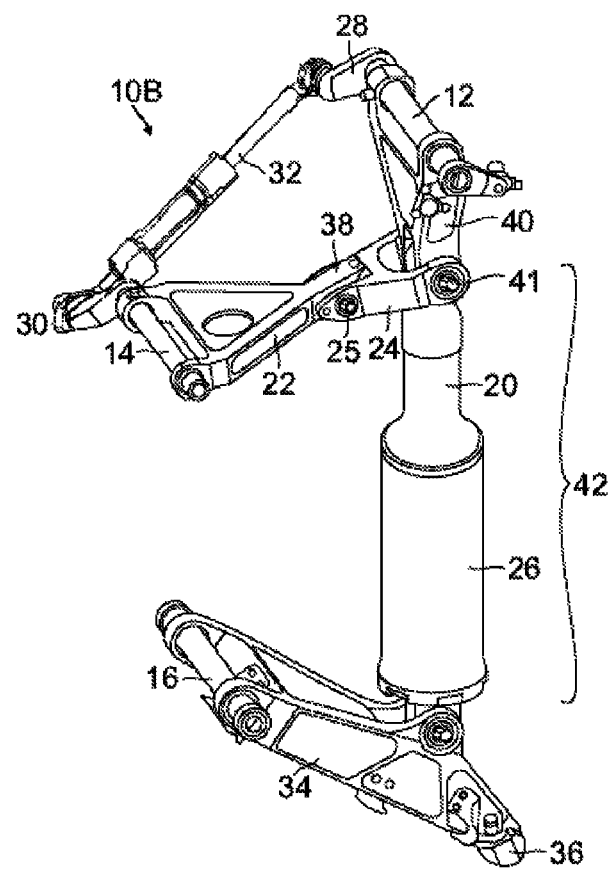

FIGS. 1A and 1B are front-and-left-side perspective views of two prior art, two-position tail skid mechanisms 10A and 10B, both shown disposed in a landing position. As can be seen in FIGS. 1A and 1B, each of the two prior art mechanisms 10A and 10B incorporate several elements that are substantially similar to each other, including three "attach pins" 12, 14, and 16 that are each pinned within surrounding aircraft structure 18 (not shown in FIG. 1B) and to which various ones of the links of the mechanisms are respectively coupled for movement relative to the structure 18, i.e., between a "stow" position (not illustrated) and an extended or "landing/takeoff" position, as illustrated in the figures.

Both prior art tail skid mechanisms 10A and 10B comprise a single vertical link 40 and an over-center locking mechanism that includes front and rear horizontal links 22 and 24 that are coupled to each other at a hinge 25. As illustrated in the figures, the shock absorber 42 has an upper half 20 and a lower half 26, and has an upper end coupled to the attach pin 41 for conjoint rotation therewith. The front end of the front horizontal link 22 is coupled to the attach pin 14 for conjoint rotation therewith. A pair of crank arms 28 and 30 are respectively coupled to corresponding outer ends of the attach pins 12 and 14 for respectively conjoint rotation therewith.

Each of the conventional tail skid mechanisms 10A and 10B includes a single actuator 32, e.g., a hydraulic or electromechanical actuator, having opposite ends respectively coupled to an outer end of one of the crank arms 28 or 30, such that extension or retraction of the actuator 32 causes a corresponding rotation or counter-rotation of the crank arms 28 and 30, and hence, of the corresponding links 40 and 42.

A lever arm 34 has a front end coupled to the attach pin 16 for rotation relative thereto, and an opposite rear end coupled to a lower end of the shock absorber 42 for rotation relative thereto. A ground contact shoe 36, e.g., a pad of a hard, abrasion-resistant material, is disposed on the rear end of the lever arm 34 at its juncture with the lower end of the shock absorber 42, such that forces imparted to the ground contact shoe 36 by the runway during a takeoff or landing act along a line passing through the center of the shock absorber 42 and vertical link 40.

As illustrated in FIGS. 1A and 1B, the over-center locking mechanism comprises a rigid finger 38 that extends rearwardly from the front horizontal link 22 and into a corresponding notch in the upper surface of the rear horizontal link 24. The rigid finger 38 prevents downward movement of the hinge 25 located between the front and rear horizontal links 22 and 24 past a locked position in which the hinge 25 is disposed a small distance below the line of action between the pin 14 and the pin 41 and the front and rear horizontal links 22 and 24 are disposed generally collinear with each other, but permits an unlocking upward movement of the hinge 25 relative to the locked position.

Thus, when the actuator 32 is extended, the vertical link 40 is extended downward to a fully extended landing/takeoff position, such that the vertical link 40 and the two horizontal links 22 and 24, along with the airplane structure 18 form a rigid, triangular structure that fixes the location of the pin 41. The shock absorber 42, the lever arm 34, the pin 41 and the airplane structure 18 form a second rigid triangular structure that fixes the location of the ground contact shoe 36 in the landing/takeoff position illustrated in the figures. Retraction of the actuator 32 causes the front horizontal link 22 to rotate counterclockwise relative to the airplane structure 18, which causes the hinge 25 to rise upwardly, thereby unlocking the over-center locking mechanism and allowing the front and rear horizontal links 22 and 24 to fold together about the hinge 25. This movement raises the vertical link 40, and hence, the ground contact shoe 36, upward to a fully retracted, or stow position (not illustrated).

While the foregoing, prior art, two-position tail skid mechanisms 10A and 10B provide satisfactory performance, they are incapable of effecting a three-position, over-center locking configuration, i.e. one in which the ground contact shoe 36 is moved between a fully retracted position or stow position, a fully extended or landing position, and an intermediate or takeoff position, and thus, impose a penalty on the takeoff performance of the associated aircraft discussed above. However, as described in detail below, it has been discovered that a three-position tail skid mechanism 100 which locks in each of a stow, landing and takeoff position, can be confected by, among other things, replacing the single vertical link 20 with two vertical links and by adding a second actuator, which can be identical to the first actuator 32 in terms of length, stroke and power. The two vertical links can lock in two positions and thereby effectively achieve two different lengths. The second actuator can attach to crank arms that attach to the same attach pins as the first actuator 32, but in so doing, achieve a second, locked, partially extended or takeoff position not achievable in the prior art mechanisms 10A or 10B.

Figure 2A:
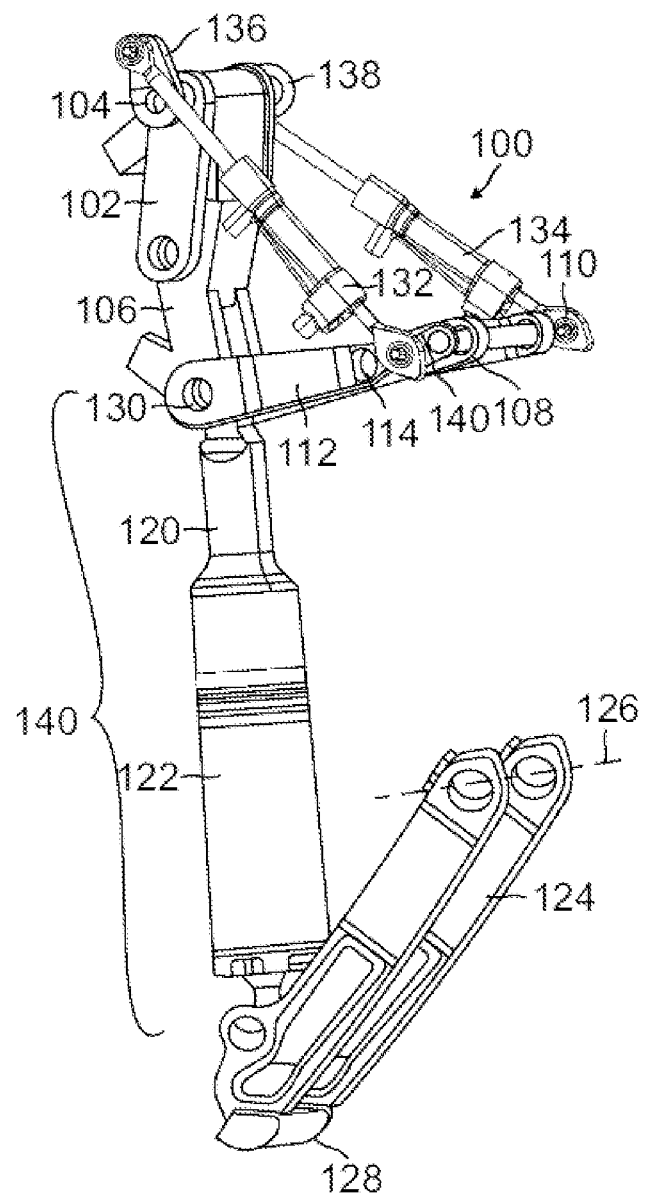
FIGS. 2A and 2B are a front-and-right-side perspective view, and a front-and-left-side perspective view, respectively, of an example embodiment of a three-position tail skid mechanism in accordance with the present disclosure, shown disposed in a landing position.
Figure 2B:
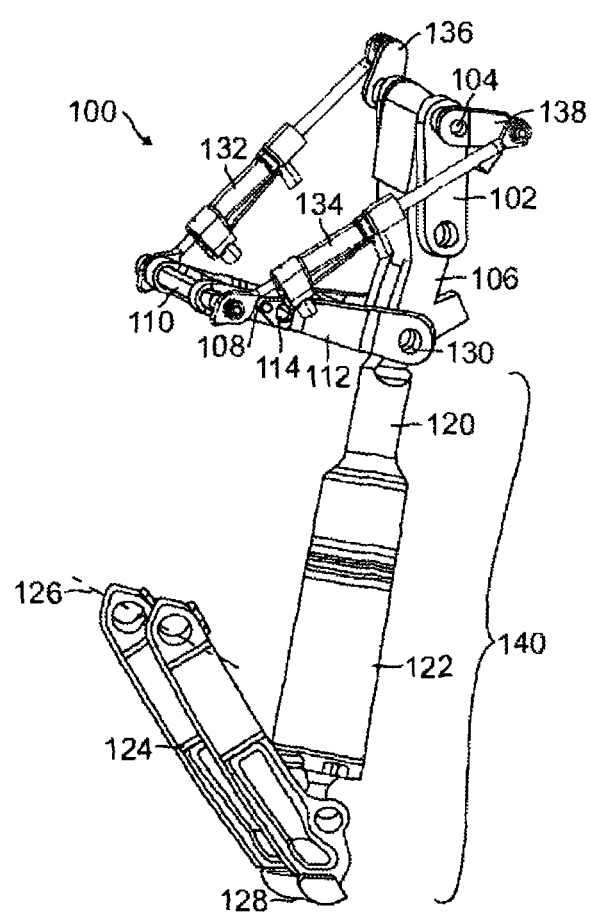

FIGS. 2A and 2B are a front-and-right-side perspective view, and a front-and-left-side perspective view, respectively, of an example embodiment of a three-position tail skid mechanism 100 in accordance with the present disclosure, shown disposed in a landing position. As illustrated in FIGS. 2A and 2B, the example tail skid mechanism 100 includes several elements similar to those of the prior art tail skid mechanisms 10A and 10B discussed above, including an upper vertical link 102 having opposite upper and lower ends, the upper end being coupled to a first attach pin 104 for conjoint rotation therewith, and a lower vertical link 106 having opposite upper and lower ends, the upper end being coupled to the lower end of the upper vertical link 102 for rotation relative thereto.

A front horizontal link 108 has opposite front end and rear ends, the front end being coupled to a second attach pin 110 for conjoint rotation therewith. A rear horizontal link 112 has opposite front and rear ends, the front end being coupled to the rear end of the front horizontal link 108 for rotational movement relative thereto and, as in the prior art mechanisms 10A and 10B described above, defining a hinge 114 between the front and rear horizontal links. The rear end of the rear horizontal link 112 is coupled to the lower end of the lower vertical link 106 for rotation relative thereto.

As in the prior art mechanisms 10A and 10B of FIGS. 1A and 1B, an over-center locking mechanism is disposed between the front and rear horizontal links 108 and 112 and is configured to prevent downward movement of the hinge 114 past a locked position in which the hinge 114 is located a small distance below the line of action between the pin 110 and the pin or node 130, as illustrated in, e.g., FIGS. 2A and 2B, and to permit unlocking upward movement of the hinge 114 relative to the locked position, as illustrated in, e.g., FIGS. 8C and 8D. As illustrated in the latter figures, the over-center locking mechanism can comprise a rigid finger 116 that extends from the first horizontal link 108 and into a corresponding notch 118 in an upper surface of the second horizontal link 112.

As illustrated in, e.g., FIGS. 2A and 2B, the example mechanism 100 further includes a shock absorber 140 having opposite upper and lower end portions 120 and 122. The upper end of the shock absorber 140 is coupled to respective ones of both the lower end of the lower vertical link 106 and the rear end of the rear horizontal link 112 for rotation relative thereto, and defines a node 130, discussed in more detail below, thereat. As in the prior art mechanisms 10A and 10B discussed above, the lower portion 122 of the shock absorber 140 can comprise a "crush cartridge," i.e., a cylinder of a crushable material, e.g., an aluminum honeycomb or other shock-absorbing material, that is configured to absorb the shock of an impact, and then be discarded and replaced after one or more uses. The shock absorber 140 can also comprise a hydraulic cylinder that is configured to absorb the shock of an impact and then be reused.

In a manner similar to the prior art mechanisms 10A and 10B discussed above, the example mechanism 100 includes a lever arm 124 having opposite front and rear ends. The front end is coupled to a third attach pin 126 for rotation relative thereto, and the rear end is coupled to the lower end of the shock absorber 140 for rotation relative thereto. A ground contact shoe 128 is disposed on the rear end of the lever arm 124.

As those of some skill will recognize, the lever arm 124, the shock absorber 140 and the ground shoe 128 can be considered together as a "follower mechanism," in that the respective positions of these elements are substantially determined by the position of the pin or node 130 defined by the juncture of the lower end of the lower vertical link 106 and the rear end of the rear horizontal link 112. Accordingly, an understanding of the motion of the former elements, and in particular, that of the ground contact shoe 128, can be obtained from an understanding of the selectably controlled movement of the elements located above the node 130 necessary to obtain that movement, as is discussed in more detail below.

Figure 4:
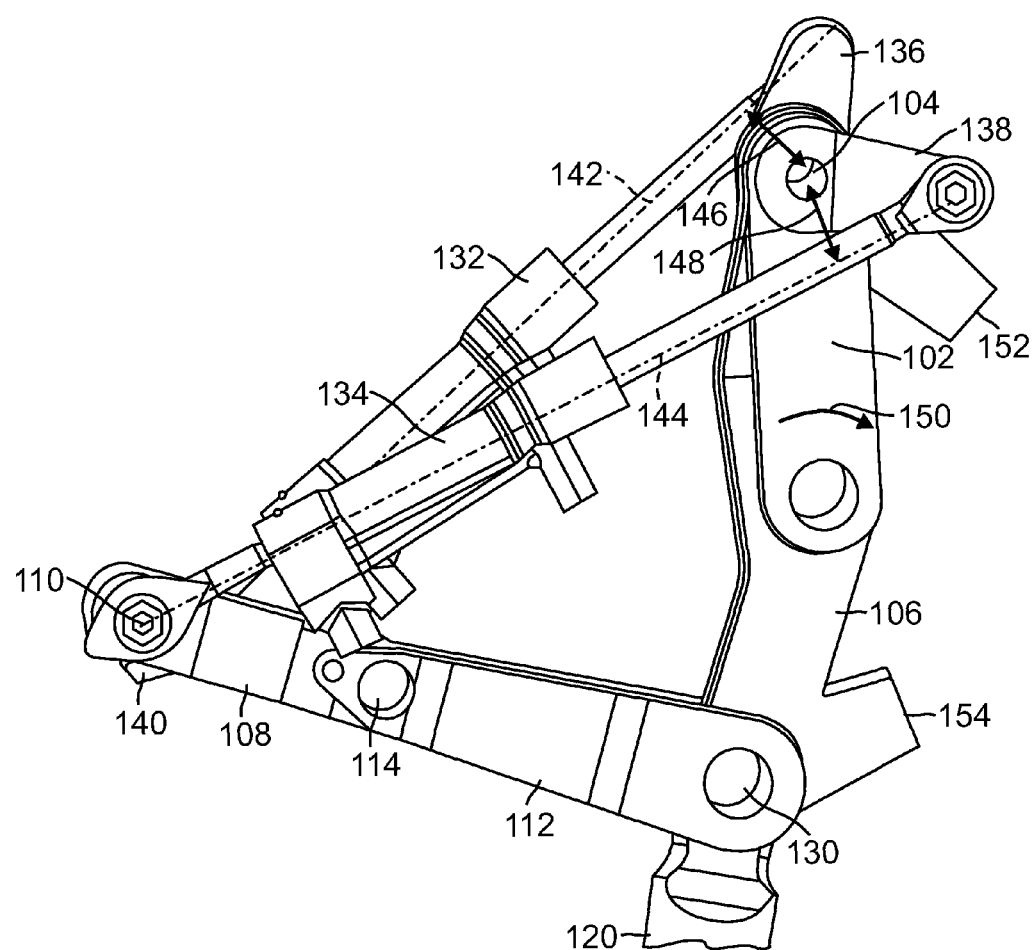
FIG. 4 is an enlarged partial left-side elevation view of the upper portion of the tail skid mechanism, showing a configuration and arrangement of a pair of actuators and a pair of crank arms thereof.

FIGS. 3A and 3B are partial left-side and right-side elevation views, respectively, of the upper portion of the tail skid mechanism 100, shown in the landing position and illustrating the configuration and arrangement of a pair of actuators 132 and 134 and a trio of actuator crank arms 136, 138 and 140 thereof, and FIG. 4 is an enlarged partial left-side elevation view of the upper portion of the tail skid mechanism 100, also shown in the landing position and illustrating the configuration and arrangement of the actuators 132 and 134 and two of the crank arms 136 and 138 thereof. As illustrated in these figures, the example tail skid mechanism 100 includes first and second crank arms 136 and 138 respectively fixed to opposite first and second ends of the first attach pin 104 for conjoint rotation therewith, and a third crank arm 140 fixed to a first end of the second attach pin 110.

The first actuator 132, referred to herein as a "stow" (S) actuator," has a first end coupled to an outer end of the first crank arm 136 for rotation relative thereto, and an opposite second end coupled to an outer end of the third crank arm 140 for rotation relative thereto. The second actuator 134, referred to herein as a takeoff/landing (TOL) actuator, has a first end coupled to an outer end of the second crank arm 138 for rotation relative thereto, and an opposite second end coupled to an end of the second attach pin 110 opposite to the first end thereof.

As illustrated in FIGS. 3A and 4, the TOL actuator 134 is rotatably attached about the centerline of the second attach pin 110, and therefore, cannot apply any turning moment to the front horizontal link 108, which is coupled to the second attach pin 110 for conjoint rotation. However, the opposite end of the TOL actuator 134 is rotatably attached to the outer end of the second crank arm 138, and can therefore apply a turning moment to the first attach pin 104, and hence, the upper vertical link 102, which is coupled to the first attach pin 104 for conjoint rotation. As illustrated in FIGS. 3B and 4, the opposite ends of the S actuator 132 are rotatably coupled to the first and second attach pins 104 and 110 through the first and third crank arms 136 and 140, and accordingly, can exert a turning moment on both attach pins 104 and 110, and hence, on both the upper vertical link 102 and the front horizontal link 108.

As illustrated in FIG. 4, the respective centerlines 142 and 144 of the S and TOL actuators 132 and 134 pass through ends of respective ones of two imaginary moment arms 146 and 148 that extend perpendicular to respective ones of the centerlines 142 and 144 and through the long axis of the first attachment pin 104. The respective lengths of these two moment arms 146 and 148 are a function of the respective lengths and relative angular positions of the first and second crank arms 136 and 138. These can be configured such that, for example, when each of the S and TOL actuators 132 and 134 is disposed in an extended state, such as illustrated in FIGS. 3A, 3B and 4, the node 130, and hence, the ground contact shoe 128, is disposed in a landing, i.e., an extended, position. In this position, the TOL actuator 134 has a greater mechanical advantage than the S actuator 132. Therefore, a "retract" command applied to the TOL actuator 134 will cause the upper vertical link 102 to rotate clockwise relative to the attach pin 104, as indicated by the arrow 150 in FIG. 4, moving the node 130, and hence, the ground contact shoe 128, from the landing position illustrated in FIG. 4 to the takeoff position illustrated in, e.g., FIG. 6C.

An "extend" command is simultaneously applied to the S actuator 132. Since the TOL actuator 134 at this position has a mechanical advantage over the S actuator 132, the S actuator 132 is compressed by the TOL actuator 134. The stow actuator extend force acts on the crank 140, causing a downward moment of the forward link 108, thus preventing the over-center locking mechanism between the front and rear horizontal links 108 and 112 from unlocking.

Figure 8A:
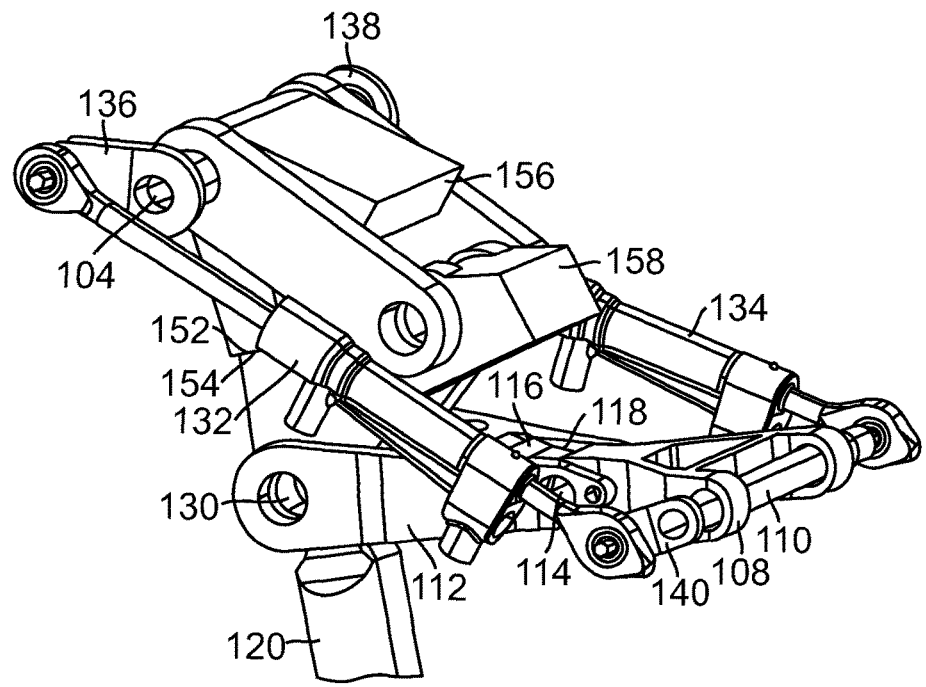
FIGS. 8A-8D are successive partial-front-and-right-side elevation views of the upper portion of the tail skid mechanism, shown moving from the takeoff position to the stow position.

In general, the configuration and arrangement of the two actuators 132 and 134 and the three crank arms 136, 138 and 140 is pre-configured such that one of the two actuators 132 or 134 is always provided with a mechanical advantage over the other actuator, depending on the position of the mechanism 100, thereby enabling two actuators 132 and 134 of substantially identical length, stroke and output force to be used effectively within the same tail skid mechanism 100. Additionally, stop features 156 and 158 can create an over-center locking mechanism between the upper and lower vertical links 102 and 106 and can be configured to prevent lateral movement of the hinge 114 past a locked position in which the upper and lower vertical links 102 and 106 are disposed generally collinear with each other, and to permit un-locking movement of the hinge 114 relative to the locked position such that, in the locked position, the upper and lower vertical links 102 and 106 can react compression loads applied by the shock absorber 140 without relative rotation between the upper and lower vertical links 102 and 106. Also, as illustrated in, e.g., FIG. 4, a first pair of abutting surfaces or "knuckles" 152 and 154 can be respectively disposed on a rear surface of the upper vertical link 104 and a rear surface of the lower vertical link 106 and configured so as to prevent a rearward rotation of the upper vertical link 102 past a first selected angle relative to the lower vertical link 106 when they are engaged with each other, such that the upper and lower vertical links 102 and 106 can react compression loads applied by the shock absorber 140 without relative rotation between upper and lower vertical links 102 and 106 as illustrated in, e.g., FIG. 6C. And, as illustrated in, e.g., FIG. 6A, showing the mechanism in the stow, or fully retracted position, a second pair of knuckles 156 and 158 can similarly be respectively disposed on a lower surface of the upper vertical link 102 and an upper surface of the lower vertical link 106 and configured to prevent forward rotation of the upper vertical link 102 past a second selected angle relative to the lower vertical link 106, as illustrated in, e.g., FIGS. 8A and 8B.

Figure 5A:
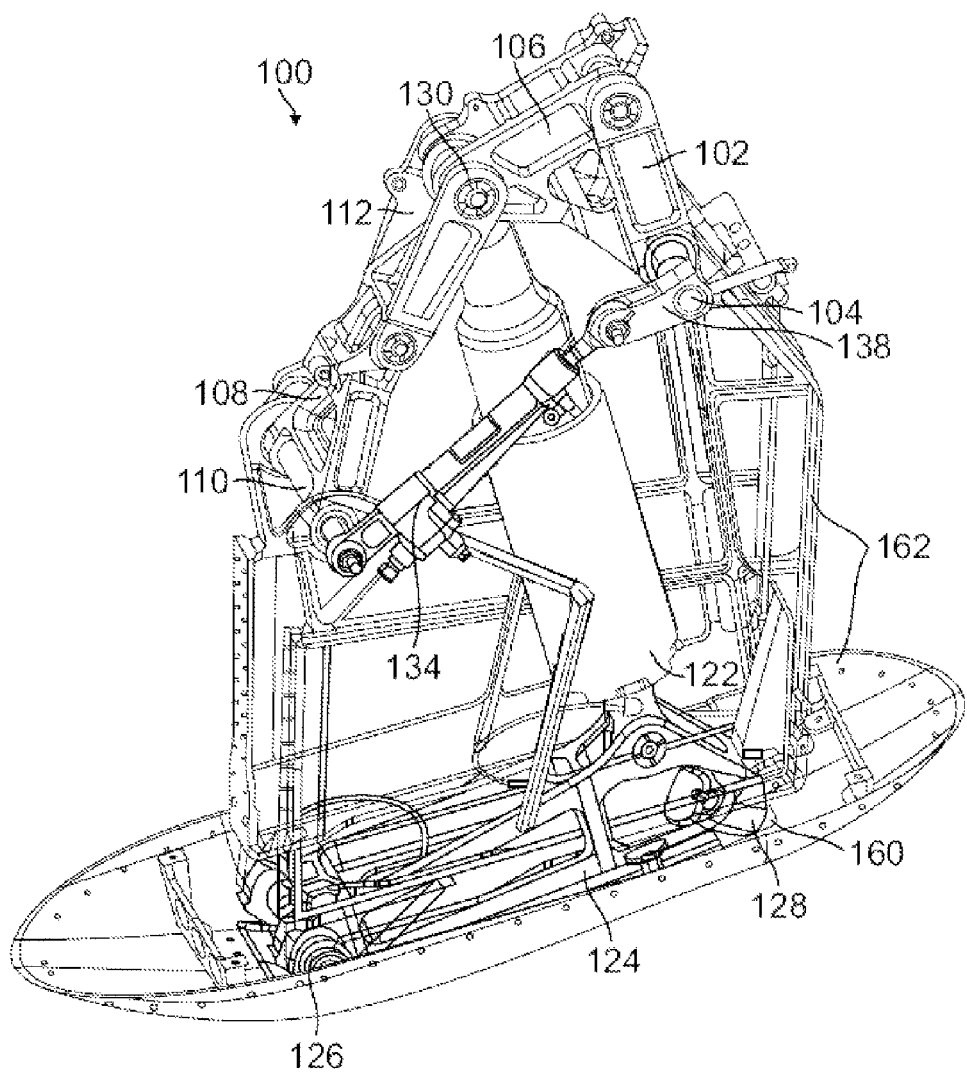
FIGS. 5A, 5B and 5C are partial front-and-left-side perspective views of the example three-position tail skid mechanism of FIGS. 2A and 2B, shown mounted within an opening in a tail portion of an aircraft fuselage structure and disposed in a stow position, a landing position, and a takeoff position, respectively.
Figure 5B:
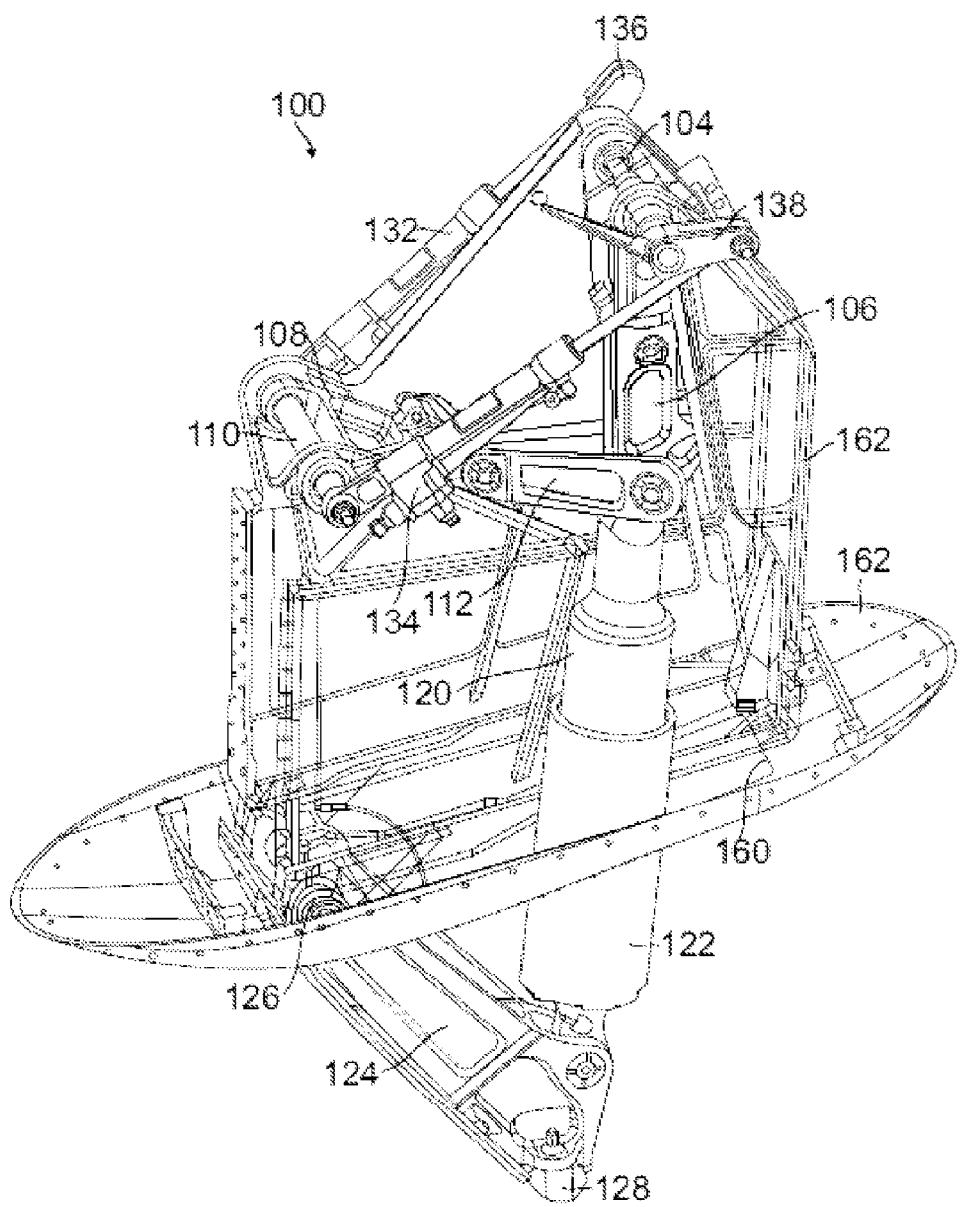
Figure 5C:
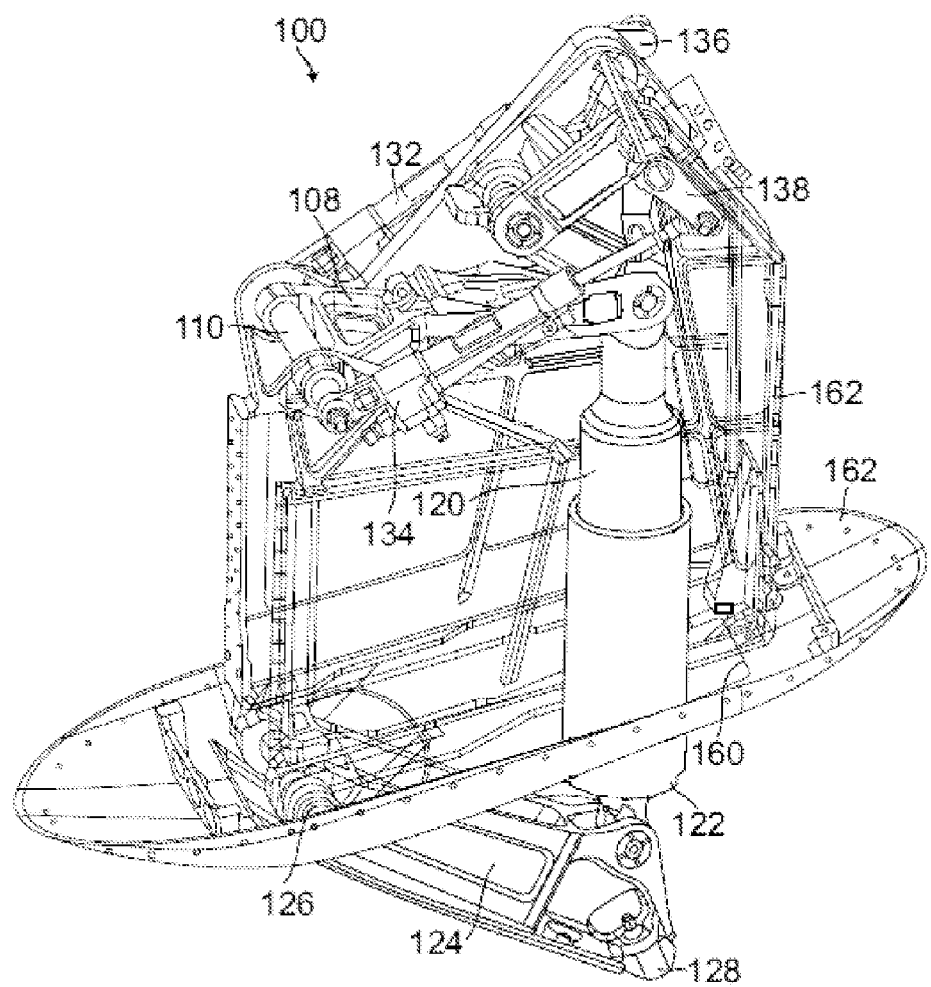

FIGS. 5A, 5B and 5C are partial front-and-left-side perspective views of the example three-position tail skid mechanism 100, shown mounted within an opening 160 in a tail portion of an aircraft fuselage structure 162 and disposed in a stow position, a landing position, and a takeoff position, respectively, and FIGS. 6A, 6B and 6C are front-and-right-side perspective views of the example tail skid mechanism 100, in which the adjacent aircraft structure 162 has been omitted for clarity, and likewise shown disposed in the stow, landing and takeoff positions, respectively.

Figures 9A, 9B:
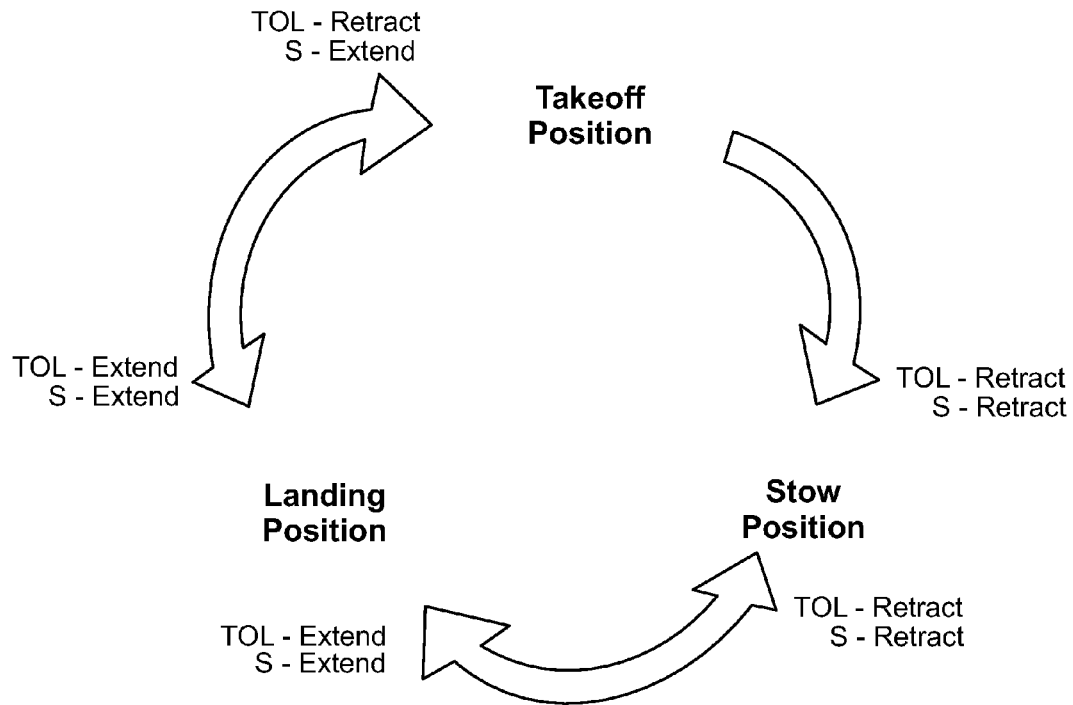
FIGS. 9A and 9B are a table and a graphic respectively summarizing the states and changes in state of a stow (S) actuator and a takeoff/landing (TOL) actuator of the tail skid mechanism during movement of the tail skid between the stow, landing and takeoff positions.

An understanding of the way in which the example tail skid mechanism 100 is actuated into respective ones of the three positions by the S and TOL actuators 132 and 134 can be obtained from a consideration of FIGS. 9A and 9B, wherein FIGS. 9A and 9B are a table and a graphic respectively summarizing the states and changes in state of the S actuator 132 and the TOL actuator 134 during movement of the ground contact shoe 128 between respective ones of the stow, landing and takeoff positions.

Thus, as indicated in FIG. 9A, when each of the S and TOL actuators 132 and 134 is disposed in a retracted state, the ground contact shoe 128 is disposed in the stow position, as illustrated in FIGS. 5A and 6A. In the particular example embodiment illustrated in the figures, the upper vertical link 102 is disposed at a maximum rearward angle of about 162 degrees relative to the vertical, and the S and TOL actuators 132 and 134 are retracted to their minimum lengths. As illustrated in FIG. 5A, in this state, the tail skid mechanism 100 is fully retracted within the opening 160 in the fuselage of the aircraft, and in some embodiments, the lever arm 124 of the mechanism 100 can be configured to act as a closure for the opening 160 for purposes of streamlining, i.e., to reducing aerodynamic drag of the mechanism 100 during flight.

As further indicated in FIG. 9A, when each of the S and TOL actuators 132 and 134 is disposed in an extended state, the upper vertical link 102 is disposed at an angle of about 0 degrees relative to the vertical, and the ground contact shoe 128 is disposed in its lowest or most extended position, i.e. the landing position, as illustrated in FIGS. 5B and 6B. The upper vertical link 102 is disposed at an angle of about 47 degrees relative to the vertical when the ground contact shoe 128 is disposed in the takeoff position, located between the landing position and the stow position, as illustrated in FIGS. 5C and 6C.

As illustrated in FIG. 9B, the ground contact shoe 128 of the mechanism 100 is moved between the stow, landing and takeoff positions by inputting commands, i.e., "extend" and/or "retract" commands, to respective ones of the S and TOL actuators 132 and 134. Thus, when the ground contact shoe 128 is disposed in the landing position, retraction of the TOL actuator 134 causes the ground contact shoe 128 to move from the landing position to the takeoff position. When the ground contact shoe 128 is disposed in the takeoff position, simultaneous extension of the S and TOL actuators 132 and 134 causes the ground contact shoe 128 to move from the takeoff position to the landing position. When the ground contact shoe 128 is disposed in the takeoff position, simultaneous retraction of the S actuator 132 and the TOL actuator 134 causes the ground contact shoe 128 to move from the takeoff position to the stow position, and when the ground contact shoe 128 is disposed in the stow position, simultaneous extension of the S actuator 132 and the TOL actuator 134 causes the ground contact shoe 128 to move from the stow position to the landing position.

As those of some skill will appreciate from an examination of FIGS. 9B and 10, the operation of the example tail skid mechanism 100 is not fully "reversible," i.e., is "unidirectional" in operation for some of the transitions between positions. Thus, as illustrated in FIG. 9B, the transitions between the takeoff position and the stow position is unidirectional. That is, while the mechanism 100 can move directly from the takeoff position to the stow position by commanding both of the S and TOL actuators 132 and 134 to retract, the mechanism 110 cannot move directly from the stow position to the takeoff position by simply reversing the foregoing procedure.

The consequences of the foregoing are that 1) the mechanism 100 cannot transition directly from the stow position to the takeoff position, but must first pass through the landing position, and 2) the mechanism 100 can transition reversibly between the landing and takeoff positions.

In sum, the S and TOL actuators 132 and 134, together with the first, second and third crank arms 136 138 and 140, are configured and arranged such that, when the ground contact shoe 128 is disposed in the landing position, simultaneous extension of the S actuator 132 and retraction of the TOL actuator 134 causes the S actuator 132 to be back-driven by the TOL actuator 134, and the upper and lower vertical links 102 and 106 to unlock from the over-center locking position and move to a compressed or folded position in which the stops 152 and 154 contact each other, causing the ground contact shoe 128 to move to the takeoff position. When the ground contact shoe 128 is disposed in the takeoff position, simultaneous retraction of the S actuator 132 and the TOL actuator 134 causes the over-center locking mechanism between the horizontal links 108 and 112 to unlock and then re-lock in the stow position. When the ground contact shoe 128 is disposed in the stow position, simultaneous extension of the S and TOL actuators 132 and 134 causes the S actuator 132 to unlock the horizontal links 108 and 112, the TOL actuator 134 causes the vertical links 102 and 106 to rotate clockwise about the attach pin 104 and then unfold into the over-center locking position. Continued extension of the S actuator 132 causes the horizontal links 108 and 112 to re-lock. As discussed above, in the direct transition from the landing position to the takeoff position, or vice-versa, no unlocking or relocking of the horizontal over-center locking mechanism between the horizontal links 108 and 112 occurs.

A better understanding of the foregoing operations can be obtained from a consideration of FIGS. 7A-7D, which are successive partial-front-and-left-side elevation views of the upper portion of the tail skid mechanism 100 in moving from the landing position to the takeoff position, and from FIGS. 8A-8D, which are successive partial-front-and-right-side elevation views of the upper portion of the tail skid mechanism 100 moving from the takeoff position to the stow position.

Figure 7A:
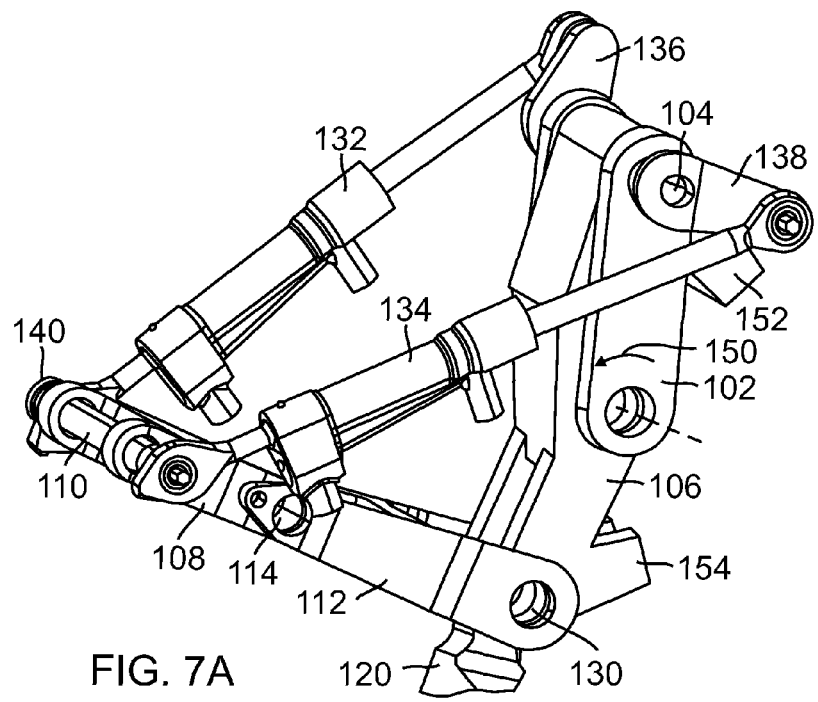
FIGS. 7A-7D are successive partial-front-and-left-side elevation views of the upper portion of the tail skid mechanism, shown moving from the landing position to the takeoff position.

Thus, in FIG. 7A, showing the upper portion of the mechanism 100 disposed in the most-extended, i.e., landing position, the upper vertical link 102 is disposed over the lower vertical link 106 at about 0 degrees relative to the vertical, with the front pair of opposing knuckles 156 and 158 on respective ones of the lower and upper surfaces of the two vertical links 102 and 106 disposed in abutment with each other, and with the knuckles 152 and 154 on respective ones of the rear surfaces spaced apart from each other. The front and rear horizontal links 108 and 112 are disposed collinear with each other, i.e., in the over-center locked state, thereby defining one of the legs of a generally triangular structure of the type discussed above in connection with the prior art tail skid mechanisms 10A and 1B, the other two legs of which consist of the aircraft fuselage structure 162 and the two vertical members 102 and 106 locked in the over-center locking state.

As discussed above, when the S actuator 132 is commanded to extend and the TOL actuator 134 is simultaneously commanded to retract, the extension of the S actuator 132 prevents the over-center locking mechanism between the two horizontal links 108 and 112 from unlocking, thus allowing the upper vertical link 102 to rotate clockwise relative to the pin 104 in the direction of the arrow 150. This, in turn, causes the pair of upper and lower knuckles 156 and 158 to separate and move away from each other, and the pair of rear knuckles 152 and 154 to move toward each other, as seen in FIGS. 7B and 7C.

Figure 7B:
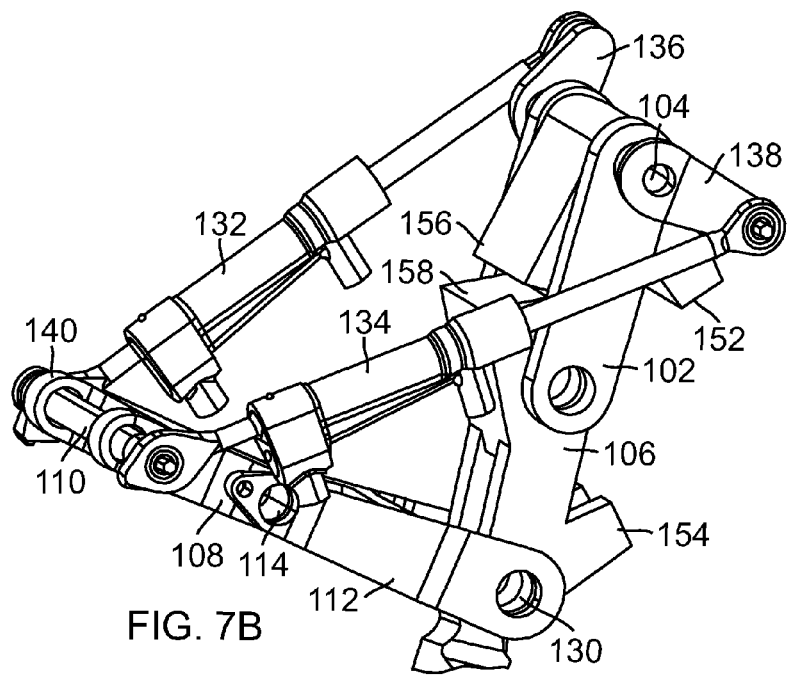
Figure 7C:
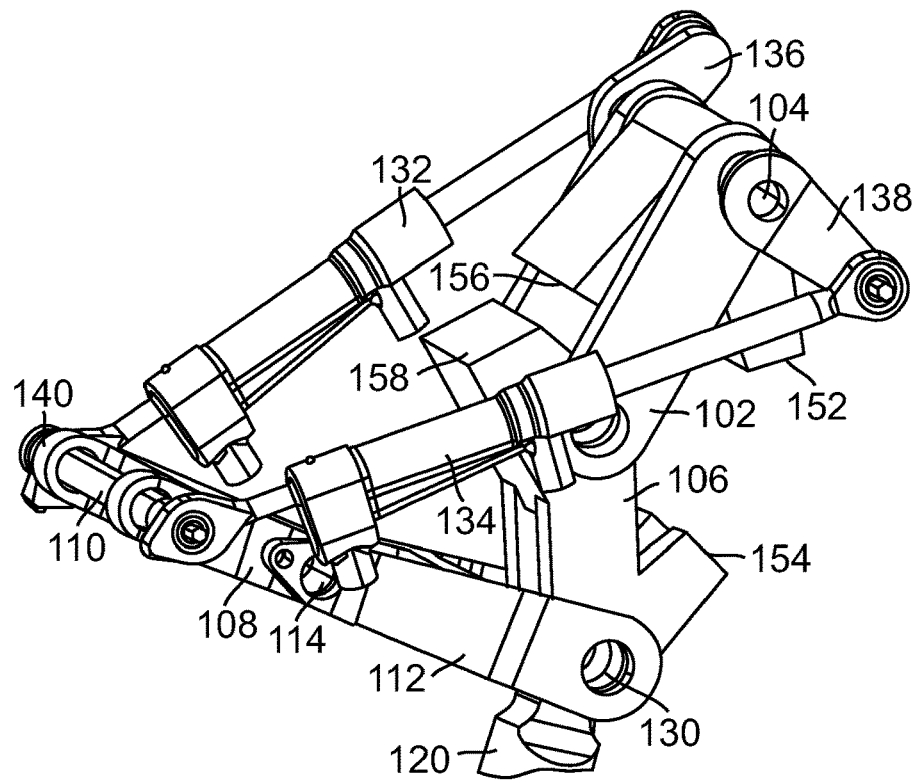
Figure 7D:
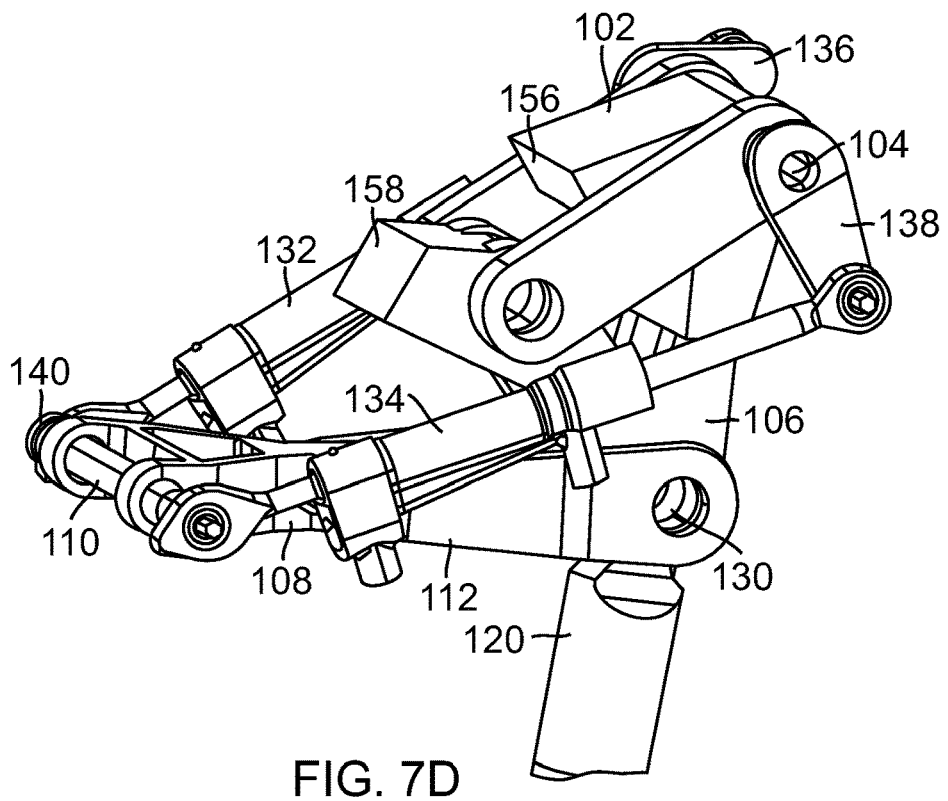

As further illustrated in FIGS. 7B and 7C, continued rotation of the upper vertical link 102 relative to the pin 104 ultimately results in the pair of knuckles 156 and 158 continuing to spread further apart, while the pair of knuckles 152 and 154 rotate into abutment with each other, as illustrated in FIG. 7D, with the upper vertical link 102 disposed at an angular position of about 47 degrees relative to the vertical. This results in the formation of a new triangular locking structure, consisting of the over-center horizontal links 108, 112, aircraft fuselage structure 162, and the folded position of the upper and lower vertical links 102 and 106, in which the two knuckles 152 and 154 are disposed in contact with each other. This position is substantially shorter than the over-center locked position of the two vertical links 102 and 106 when disposed in the takeoff position of FIG. 7A. As above, this folding of the vertical links 102 and 106 results in an upward movement of the node 130, and hence, the ground contact shoe 128, i.e., to the landing position. It may be noted that, in the foregoing transition, it was unnecessary to unlock the over-center locking mechanism between the two horizontal links 108 and 112.

The case is not the same for either the transition from the stow position to the landing position, or, as illustrated in FIGS. 8A-8D, the transition from the takeoff position to the stow position. Thus, in FIG. 8A, the upper end portion of the mechanism is shown disposed in the takeoff position, with the rear knuckles 152 and 154 disposed in abutment with each other, as discussed above in connection with FIG. 7D. As discussed above in connection with FIGS. 9A and 9B, if the S and TOL actuators 132 and 134 are then both commanded to retract, the front horizontal link 108 is rotated clockwise relative to the pin 110, causing the over-center locking finger 116 to rotate out of engagement with the corresponding notch 118 in the rear horizontal member 112, thereby unlocking the over-center locking mechanism and causing the two horizontal members 108 and 112 to rotate or fold together about the hinge 114 between them.

Figure 8B:
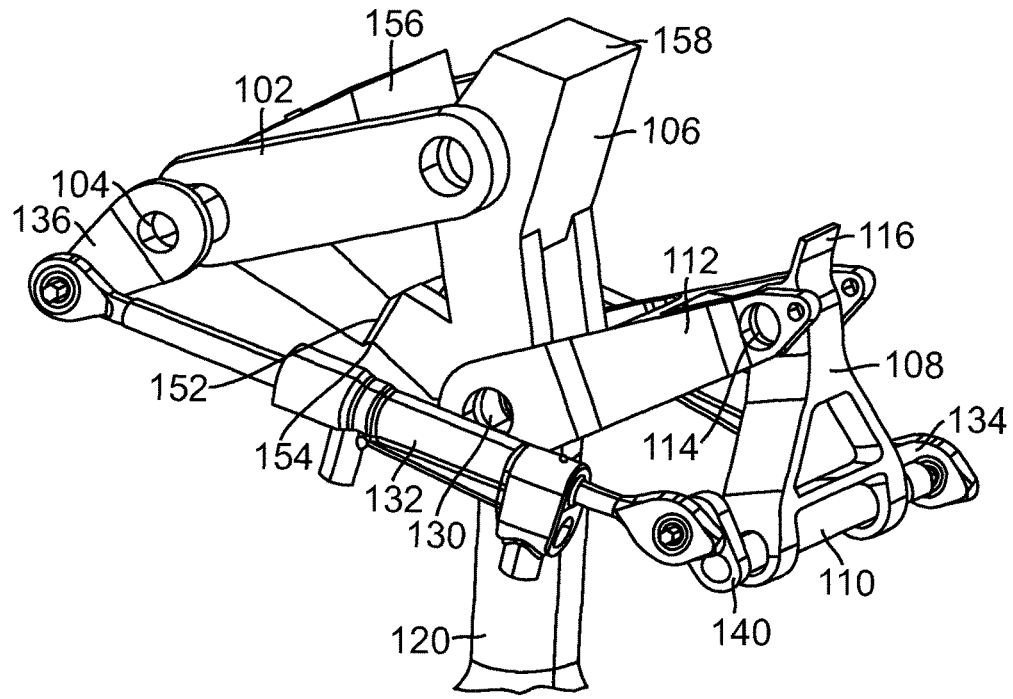
Figure 8C:
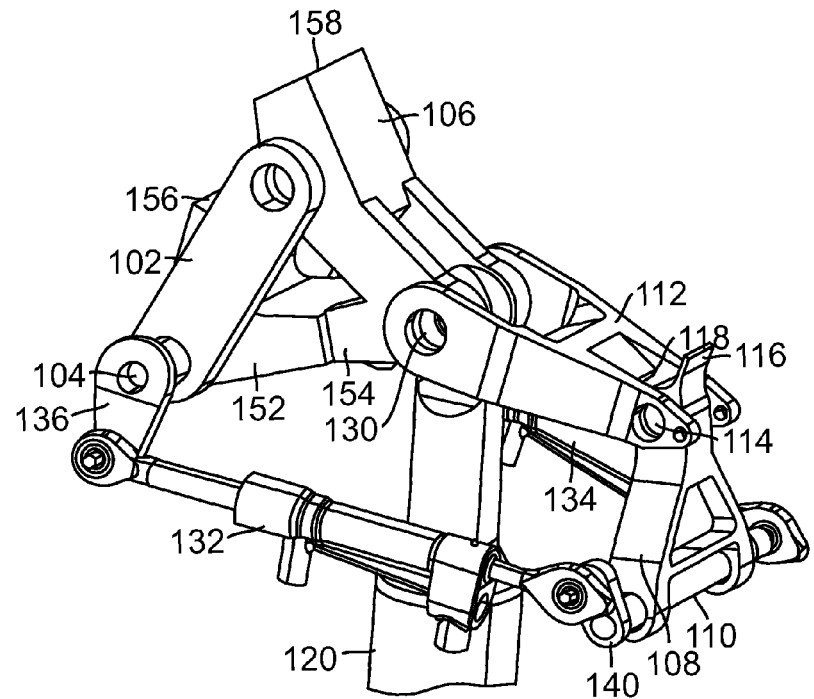

As illustrated in FIGS. 8B and 8C, this unlocking enables the upper and lower vertical links 102 and 106 to rotate as a fixed unit rearwardly about the pin or node 130. The knuckles 152 and 156 may or may not be disposed in abutment with each other.

Figure 8D:
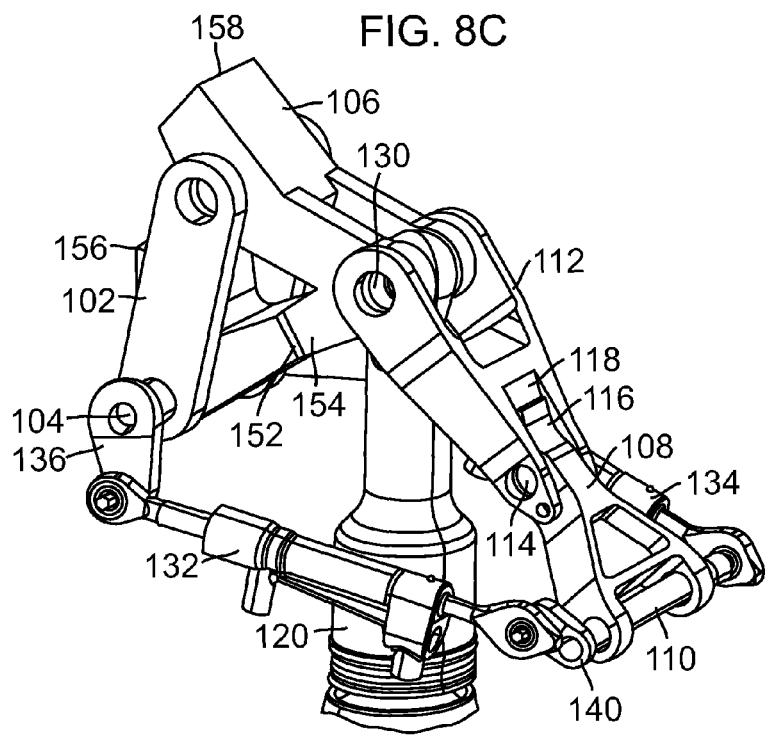

As illustrated in FIGS. 8C and 8D, the crank arms 136 and 140 are oriented such that retraction of the S actuator 132 initially causes the forward horizontal link 108 to rotate clockwise with respect to the pin 110 when moving from the takeoff position to the stow position. However, the favorable angular clocking and length of the crank arm 136 over the crank arm 140 changes the line of action for the S actuator 132 as the links 104 and 108 rotate. As illustrated in FIG. 8D, the angular clocking of crank 140 at or near the stow position causes the link 108 to reverse direction and rotate counterclockwise, causing the over-center locking mechanism between the horizontal links 108 and 112 to relock in the generally collinear, over-center position, with the upper vertical link rotated rearwardly at an angle of about 162 degrees relative to the vertical. Thus, a new triangular locking structure is defined, comprising the over-center locked horizontal links 108 and 112, the aircraft fuselage structure 162, and the abutting, generally collinear knuckles 152 and 154 of the vertical links 102 and 106. As may be seen in a comparison of FIGS. 8A, i.e., the takeoff position, and 8D, i.e., the stow position, the node 130 at the upper end of the shock strut cartridge 120 moves from a position disposed below the actuators 132 and 134 to a position disposed well above them. A similar unlocking and re-locking of the over-center locking mechanism and resulting re-definition of the triangular over-center locking structure occurs during the transition from the stow position, shown in FIGS. 5A and 6A, to the takeoff position, shown in FIGS. 5B and 6B.

As those of some skill in this art will understand, since large modern aircraft are equipped with a plurality of sensors that automatically sense the state of various components of the aircraft, it is relatively easy to automate much of the actuation of the example tail skid mechanism 100 and thereby free the pilot of having to remember to do so. In particular, many large commercial aircraft have sensors that detect, among other things, when the landing gear of the aircraft is deployed, and if so, whether the landing gear is bearing the weight of the aircraft, such as when the aircraft is disposed on the ground, i.e., on a runway or tarmac. Accordingly, an automatic control system can easily be confected for the example tail skid mechanism 100 which senses whether the landing gear of the aircraft is deployed, and if so, whether the landing gear is bearing the weight of the aircraft. If the automatic control system senses that the landing gear is not deployed, the system can automatically move the ground contact shoe 128 to the stow position. If the control system senses that the landing gear is deployed but is not bearing the weight of the aircraft, the system can automatically move the ground contact shoe 128 to the landing position, and if the system senses the landing gear is deployed and is bearing the weight of the aircraft, the control system can automatically move the ground contact shoe 128 to the takeoff position.

As those of skill will by now appreciate, and depending on the particular application at hand, many modifications, substitutions and variations can be made in and to the materials, apparatus, configurations and methods of the present disclosure without departing from the spirit and scope thereof. In light of this, the scope of the present invention should not be understood as being limited to those of the particular embodiments illustrated and described herein, as they are merely by way of some examples thereof, but rather, should be fully commensurate with that of the claims appended hereafter and their functional equivalents.

What is claimed is:

1. A system, comprising:
   an aircraft having a fuselage with a tail portion; and
   a tail skid disposed in an opening of the tail portion, the tail skid comprising:
   a ground contact shoe; and
   a mechanism configured to selectably move the ground contact shoe between respective ones of a stow position disposed within the opening, a landing position disposed below the opening, and a takeoff position different than the stow and landing positions, wherein the mechanism comprises:
   first and second attach pins respectively pinioned within a structure of the aircraft for rotation relative thereto;
   a linkage comprising two pairs of links coupled between the first and second attach pins and defining a node at a middle of the linkage; and
   an actuating device configured to selectably rotate respective ones of the first and second attach pins in such a way as to move the node between positions respectively corresponding to the stow, landing, and takeoff positions, and wherein the actuating device comprises:
   first and second crank arms respectively fixed to opposite first and second ends of the first attach pin for conjoint rotation;
   a third crank arm fixed to a first end of the second attach pin for conjoint rotation; and
   first and second actuators, each having opposite ends, wherein
   a first end of the first actuator is coupled to an outer end of the first crank arm for relative rotation,
   a second end of the first actuator is coupled to an outer end of the third crank arm for relative rotation,
   a first end of the second actuator is coupled to an outer end of the second crank arm for relative rotation, and
   a second end of the second actuator is coupled to an end of the second attach pin opposite to the first end thereof for relative rotation.

2. The system of claim 1, wherein the linkage comprises:
   first and second vertical links, each having opposite ends, wherein
   an upper end of the first vertical link is coupled to the first attach pin for conjoint rotation therewith,
   an upper end of the second vertical link is coupled to a lower end of the first vertical link for rotation relative thereto; and
   first and second horizontal links, each having opposite ends, wherein
   a front end of the first horizontal link is coupled to the second attach pin for conjoint rotation therewith,
   a front end of the second horizontal link is coupled to a rear end of the first horizontal link for rotation relative thereto, and
   a rear end of the second horizontal link is coupled to a lower end of the second vertical link for rotation relative thereto at the node.

3. The system of claim 1, further comprising a dual over-center locking mechanism for locking the ground contact shoe in each of the stow, landing and takeoff positions.

4. The system of claim 3, wherein the dual over-center locking mechanism comprises:
   a first over-center mechanism that contains a first horizontal stop feature disposed on a first horizontal link and a second horizontal stop feature disposed on a second horizontal link, the first and second horizontal stop features being configured to prevent downward movement of a hinge defined between the first and second horizontal links when the two horizontal stop features are disposed in contact with each other and past a locked position in which the hinge is disposed below a load line extending between two horizontal link attach points and to permit unlocking upward movement of the hinge relative to the locked position; and a second over-center mechanism that contains a first vertical stop feature disposed on a first vertical link and a second vertical stop feature disposed on a second vertical link, the first and second vertical stop features being configured to prevent lateral movement aft of a hinge defined between the first and second vertical links when the two stop features are in contact with each other and past a locked position in which the hinge is disposed aft of a load line extending between the two horizontal link attach points and to permit unlocking forward movement of the hinge relative to the locked position.

5. The system of claim 3, further comprising a mechanism for unlocking then re-locking the over-center locking mechanism when the ground contact shoe is moved from the takeoff position to the stow position, and the ground contact shoe is moved from the stow position to the landing position.

6. The system of claim 1, wherein the mechanism further comprises:
an elongated shock absorber having opposite ends, a first end being coupled to the node for relative rotation; and
a lever arm having opposite ends, a first end being coupled to a third attach pin for relative rotation and a second end being coupled to a second end of the shock absorber for relative rotation, wherein the ground contact shoe is disposed on the second end of the lever arm.

7. The system of claim 6, wherein the shock absorber compresses to absorb energy.

8. A method for protecting an aircraft against tail strike damage, the method comprising:
providing a tail skid disposed in an opening of a tail portion of the aircraft, the tail skid comprising an elongated shock absorber having a ground contact shoe disposed at a lower end thereof, the ground contact shoe being moveable between respective ones of a stowed position disposed within the opening, a landing position disposed below the opening, and a takeoff position disposed at a position different than the stowed and the landing positions, and a dual over-center locking mechanism operable to releasably lock the ground contact shoe in respective ones of the stowed, landing, and takeoff positions;
moving the ground contact shoe to the takeoff position before a takeoff such that, in an over-rotation of the aircraft during the takeoff, the ground contact shoe makes contact with a ground surface and the shock absorber absorbs a shock of the contact to reduce tail strike damage to the aircraft; and
releasably locking the ground contact shoe in the takeoff position with the dual over-center locking mechanism.

9. The method of claim 8, further comprising:
moving the ground contact shoe to the landing position before a landing such that, in an over-flaring of the aircraft during the landing, the ground contact shoe makes contact with the ground surface and the shock absorber absorbs a shock of the contact to reduce tail strike damage to the aircraft; and releasably locking the ground contact shoe in the landing position with the dual over-center locking mechanism.

10. The method of claim 8, further comprising:
sensing whether a landing gear of the aircraft is deployed;
sensing whether the landing gear is bearing a weight of the aircraft;
moving the ground contact shoe to the stowed position if the landing gear is not deployed;
moving the ground contact shoe to the landing position if the landing gear is deployed and is not bearing the weight of the aircraft;
moving the ground contact shoe to the takeoff position if the landing gear is deployed and is bearing the weight of the aircraft; and
releasably locking the ground contact shoe in the position to which it was moved with the dual over-center locking mechanism.

11. A tail skid mechanism, comprising:
an upper vertical link having opposite upper and lower ends, the upper end being coupled to a first attach pin for conjoint rotation therewith;
a lower vertical link having opposite upper and lower ends, the upper end being coupled to the lower end of the upper vertical link for rotation relative thereto and defining a first hinge between the upper and lower vertical links;
a front horizontal link having opposite front end and rear ends, the front end being coupled to a second attach pin for conjoint rotation therewith;
a rear horizontal link having opposite front and rear ends, the front end being coupled to the rear end of the front horizontal link for rotational movement relative thereto and defining a second hinge between the front and rear horizontal links, the rear end being coupled to the lower end of the lower vertical link for rotation relative thereto;
a first over-center locking mechanism extending between the upper and lower vertical links and configured to prevent aft movement of the first hinge past a locked position in which the upper and lower horizontal links are disposed generally collinear with each other and to permit unlocking forward movement of the first hinge relative to the locked position;
a second over-center locking mechanism extending between the front and rear horizontal links and configured to prevent downward movement of the second hinge past a locked position in which the front and rear horizontal links are disposed generally collinear with each other, and to permit unlocking upward movement of the hinge relative to the locked position;
a shock strut cartridge having opposite upper and lower ends, the upper end being coupled to respective ones of the lower end of the lower vertical link and the rear end of the rear horizontal link for rotation relative thereto;
a lever arm having opposite front and rear ends, the front end being coupled to a third attach pin for rotation relative thereto and the rear end being coupled to the lower end of the shock strut cartridge for rotation relative thereto;
a ground contact shoe disposed on the rear end of the lever arm;
first and second crank arms respectively fixed to opposite first and second ends of the first attach pin for conjoint rotation therewith;
a third crank arm fixed to a first end of the second attach pin for conjoint rotation therewith;

a stow actuator having opposite first and second ends, the first end being coupled to an outer end of the first crank arm for rotation relative thereto, the second end being coupled to an outer end of the third crank arm for rotation relative thereto; and a takeoff/landing actuator having opposite first and second ends, the first end being coupled to an outer end of the second crank arm for rotation relative thereto, and the second end being coupled to an end of the second attach pin opposite to the first end thereof for rotation relative thereto.

12. The tail skid mechanism of claim 11, wherein the first, second and third crank arms are configured and arranged such that:

when each of the stow and takeoff/landing actuators is disposed in an extended state, the ground contact shoe is disposed in a landing position;

when each of the stow and takeoff/landing actuators is disposed in a retracted state, the ground contact shoe is disposed in a stow position; and when the stow actuator is disposed in an extended state and the takeoff/landing actuator is disposed in a retracted state, the ground contact shoe is disposed in a takeoff position that is located between the landing position and the stow position.

13. The tail skid mechanism of claim 12, wherein the first, second and third crank arms are configured and arranged such that:

when the ground contact shoe is disposed in the landing position, simultaneous extension of the stow actuator and retraction of the takeoff/landing actuator causes the ground contact shoe to move from the landing position to the takeoff position;

when the ground contact shoe is disposed in the takeoff position, simultaneous retraction of the stow actuator and extension of the takeoff/landing actuator causes the ground contact shoe to move from the takeoff position to the landing position;

when the ground contact shoe is disposed in the takeoff position, simultaneous retraction of the stow actuator and the takeoff/landing actuator causes the ground contact shoe to move from the takeoff position to the stow position; and when the ground contact shoe is disposed in the stow position, simultaneous extension of the stow actuator and the takeoff/landing actuator causes the ground contact shoe to move from the stow position to the landing position.

14. The tail skid mechanism of claim 12, wherein the first, second and third crank arms are configured and arranged such that:

when the ground contact shoe is disposed in the landing position, simultaneous extension of the stow actuator and retraction of the takeoff/landing actuator causes the takeoff/landing actuator to control the rotation of the vertical links in opposition to the stow actuator.

15. The tail skid mechanism of claim 12, wherein the first, second and third crank arms are configured and arranged such that:

when the ground contact shoe is disposed in the takeoff position, simultaneous retraction of the stow actuator and the takeoff/landing actuator causes the over-center locking mechanism to unlock and then re-lock; and when the ground contact shoe is disposed in the stow position, simultaneous extension of the stow actuator and the takeoff/landing actuator causes the over-center locking mechanism to unlock and then re-lock.

16. The tail skid mechanism of claim 11, further comprising a pair of stops respectively disposed on a rear surface of the upper vertical link and a rear surface of the lower vertical link and configured to prevent folding of the upper vertical link past a first selected acute angle relative to the lower vertical link.

17. A system, comprising:

an aircraft having a fuselage with a tail portion; and a tail skid disposed in an opening of the tail portion, the tail skid comprising:

a ground contact shoe;

a mechanism configured to selectably move the ground contact shoe between respective ones of a stow position disposed within the opening, a landing position disposed below the opening, and a takeoff position different than the stow and landing positions; and a dual over-center locking mechanism for locking the ground contact shoe in each of the stow, landing and takeoff positions, wherein the dual over-center locking mechanism comprises:

a first vertical link comprising a first knuckle and a second knuckle; and a second vertical link coupled to the first link and comprising a third knuckle and a fourth knuckle, wherein the second knuckle contacts the fourth knuckle in the landing position, wherein the first vertical link and a second vertical link are disposed in a first rotational configuration in the takeoff position and disposed in a second rotational configuration in the stow position, and wherein the first knuckle contacts the third knuckle in both the takeoff position and the stow position.

18. The system of claim 17, wherein the dual over-center locking mechanism further comprises:

a first horizontal link comprising a first horizontal stop feature;

a second horizontal link comprising a second horizontal stop feature, wherein the first and second horizontal stop features are configured to prevent downward movement of a hinge defined between the first and second horizontal links when the first and second horizontal stop features disposed contact and past a locked position in which the hinge is disposed below a load line extending between two horizontal link attach points and to permit unlocking upward movement of the hinge relative to the locked position.

19. The system of claim 17, further comprising a mechanism for unlocking then re-locking the over-center locking mechanism when the ground contact shoe is moved from the takeoff position to the stow position, and the ground contact shoe is moved from the stow position to the landing position.

20. The system of claim 17, wherein the dual over-center locking mechanism further comprises:

first and second attach pins respectively pinioned within a structure of the aircraft for rotation relative thereto, wherein the first attach pin is coupled to the first vertical link and the second attach pin is coupled to the second vertical link, and wherein the first vertical link and the second vertical link define a node at a middle of the first and second vertical links; and an actuating device configured to selectably rotate respective ones of the first and second attach pins in such a way as to move the node between positions respectively corresponding to the stow, landing and takeoff positions.

21. The system of claim 20, wherein the dual over-center locking mechanism further comprises:
   first and second horizontal links, each having opposite ends, wherein
      a front end of the first horizontal link is coupled to the second attach pin for conjoint rotation therewith,
      a front end of the second horizontal link is coupled to a rear end of the first horizontal link for rotation relative thereto, and
      a rear end of the second horizontal link is coupled to a lower end of the second vertical link for rotation relative thereto at the node.

22. The system of claim 20, wherein the actuating device comprises:
   first and second crank arms respectively fixed to opposite first and second ends of the first attach pin for conjoint rotation;
   a third crank arm fixed to a first end of the second attach pin for conjoint rotation; and
   first and second actuators, each having opposite ends, wherein
      a first end of the first actuator is coupled to an outer end of the first crank arm for relative rotation,
      a second end of the first actuator is coupled to an outer end of the third crank arm for relative rotation,
      a first end of the second actuator is coupled to an outer end of the second crank arm for relative rotation, and
      a second end of the second actuator is coupled to an end of the second attach pin opposite to the first end thereof for relative rotation.

23. The system of claim 20, wherein the dual over-center locking mechanism further comprises:
   an elongated shock absorber having opposite ends, a first end being coupled to the node for relative rotation; and
   a lever arm having opposite ends, a first end being coupled to a third attach pin for relative rotation and a second end being coupled to a second end of the shock absorber for relative rotation, wherein the ground contact shoe is disposed on the second end of the lever arm.

24. The system of claim 23, wherein the shock absorber compresses to absorb energy.

* * * * *